United States Patent Office — 3,294,799, Patented Dec. 27, 1966

3,294,799
2-ARYL - 7 - OXOPTERIDINECARBOXAMIDES AND 2 - ARYL-7-OXO-PTERIDINETHIOCARBOXAMIDES
Thomas S. Osdene, Richmond, Va., assignor to American Home Products Corporation, New York, N.Y., a corporation of Delaware
No Drawing. Filed Oct. 22, 1965, Ser. No. 502,543
14 Claims. (Cl. 260—251.5)

This invention relates to new and useful 2-aryl-7-oxopteridinecarboxamides as well as to their corresponding sufur containing compounds. In particular, the present invention is concerned with 4-amino-7-oxo-2-aryl-6-pteridinecarboxamides and 4-amino-7-oxo-2-aryl-6-pteridinethiocarboxamides having pharmacological activity.

The novel compounds which are included within the scope of this invention are represented by the following formula:

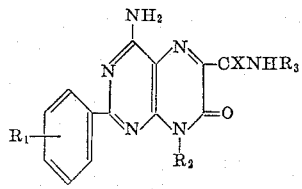

wherein $R_1$ is selected from the group consisting of hydrogen, trifluoromethyl, halogen, lower alkyl, and lower alkoxy; $R_2$ is lower alkyl; $R_3$ is selected from the group consisting of hydrogen, lower alkyl, lower alkoxy (lower)alkyl, lower alkylthio(lower)alkyl; and X is selected from the group consisting of oxygen and sulfur.

The new compounds of the aforesaid formula where X is oxygen, properly are called "oxopteridinecarboxamides." Typical examples thereof are: 4-amino-7,8-dihydro-N-(2-methoxyethyl)-8-methyl - 7 - oxo-2-phenyl-6-pteridinecarboxamides; 4-amino-7,8-dihydro - N-methyl-8-methyl-7-oxo-2-phenyl-6-pteridinecarboxamide and 4-amino-7,8-dihydro-8-ethyl-N-(2-methoxyethyl)-7 - oxo-2-phenyl-6-pteridinecarboxamide. Alternatively when X is sulfur, the compounds are called "oxopteridinethiocarboxamides" such as, 4-amino-7,8-dihydro-N-(2-methoxyethyl)-8-methyl-7-oxo-2-pheny l- 6-pteridinecarboxamide; 4-amino-7,8-dihydro-N-methyl-8-methyl-7 - oxo-2-phenyl-6 - pteridinethiocarboxamide and 4-amino - 8-ethyl-7,8-dihydro-N-(2-methoxyethyl) - 7 - oxo-2-phenyl-6-pteridinecarboxamide.

The novel oxopteridinecarboxamides of the present invention may be prepared by the reaction of a hydroxypteridinecarboxamide of the formula:

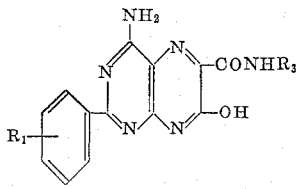

wherein $R_1$ and $R_3$ are defined as above, with di(lower)alkylsulfate, in the presence of an alkaline aqueous solution, at a temperature range from about 5° C. to about 80° C. for a period of about ten minutes to about six hours. Preferably, this reaction is conducted in an aqueous sodium hydroxide solution within the temperature range of 10° C. to 45° C. for a period of between fifteen minutes to two hours.

After the reaction period, the mixture is cooled and the precipitated product is separated by filtration or decantation. The product may be further purified by conventional means, such as recrystallization. Preferred solvents for this purpose are alkanols, and glycol ethers.

Many of the reactants utilized in this process to synthesize the compounds of this invention, such as the di(lower) alkyl sulfates, are known compounds which are readily available from commercial sources. The hydroxypteridinecarboxamides starting compounds are prepared by the method described in co-pending U.S. patent application Ser. No. 337,177 filed on January 13, 1964, now Patent No. 3,254,085.

The novel oxopteridinethiocarboxamides of the present invention may be prepared by the reaction of the above produced oxopteridinecarboxamides with phosphorus pentasulfide, in the presence of an anhydrous, reaction-inert organic solvent at a temperature from about 30° C. to about 115° C. for a period of about 30 minutes to about four hours. Preferably, this reaction is conducted in anhydrous pyridine at the reflux temperature of the reaction mixture for about one hour.

After the reaction period, the reaction mixture is washed with water and the residue is purified by conventional means, for example, recrystallized from a glycol ether and an alkanol.

The time and temperature ranges utilized in the above mentioned reactions are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By alkaline aqueous solution is meant water containing an alkaline reagent such as the hydroxide of an alkali metal. The amount of solvent used is not critical, it being only necessary to use sufficient solvent to provide a reaction medium for the reactants.

In accord with the present invention, the oxopteridinecarboxamides and oxopteridinethiocarboxamides herein described have been found to possess interesting pharmaceutical properties which render them useful as synthetic medicinals. More particularly, these compounds, in standard pharmacological tests, have exhibited utility as anti-inflammatory agents. Further, the oxopteridinecarboxamides of this invention have demonstrated a utility as intermediates in the production of their corresponding oxopteridinethiocarboxamides.

When the compounds of this invention are employed as anti-inflammatory agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 1 mg. to about 100 mg. per kg. of body weight per day, although as aforementioned variations will occur. However, a dosage level that is in the range of from about 5 mg. to about 50 mg. per kg. of body weight per day is most desirably employed in order to achieve effective results.

The following examples are given by way of illustration and are not to be construed as limitations of this invention, many variations of which are possible without departing from the scope and spirit thereof.

Example I

To a solution of 30 ml. of 3 N sodium hydroxide in 75 ml. of water is added 6.8 g. of 4-amino-7-hydroxy-N-(2-methoxyethyl) - 2-phenyl-6-pteridinecarboxamide, and a solution is obtained by gentle warming. This solution is then cooled to 15° C., and 3 ml. of dimethylsulfate is added dropwise with stirring. A yellow precipitate slowly comes out of solution which is stirred for 30 minutes. This material is removed by filtration and recrystallization from ethanol affords 4-amino-7,8-dihydro-N-(2-methoxyethyl)-8-methyl-7-oxo-2-phenyl-6 - pteridinecarboxamide, M.P. 235–237° C.

*Analysis.*—Calc'd for $C_{17}H_{18}N_6O_3$: C, 57.62; H, 5.12; N, 23.72; $OCH_3$, 8.76. Found: C, 57.90; H, 5.21; N, 23.53; $OCH_3$, 8.77.

Example II

A mixture of 10.63 g. of 4-amino-7,8-dihydro-N-(2-methoxyethyl) - 8 - methyl-7-oxo-2-phenyl-6-pteridinecarboxamide, from Example I, and 14.68 g. of phosphorus pentasulfide in 510 ml. of dry pyridine is stirred and boiled under reflux for one hour. The resulting mixture is poured into 1 liter of hot water and, after cooling, the precipitate which forms is removed by filtration. Recrystallization from 2-ethoxyethanol followed by a further crystallization from n-butanol affords 4-amino-7,8-dihydro - N - (2 - methoxyethyl) - 8-methyl-7-oxo-2-phenyl-6-pteridinethiocarboxamide, M.P. 278° C.

*Analysis.*—Calc'd for $C_{17}H_{18}N_6SO_2$: C, 55.12; H, 4.90; N, 22.69; S, 8.66. Found: C, 55.43; H, 5.03; N, 22.06; S, 8.9.

Example III

The procedure of Example I is repeated reacting the hereinafter listed dialkyl sulfates and hydroxypteridinecarboxamides to yield the following products:

| Starting Materials | Products |
| --- | --- |
| 4-amino-2-(p-chlorophenyl)-N-(2-ethylthioethyl)-7-hydroxy-6-pteridinecarboxamide and dimethylsulfate. | 4-amino-2-(p-chlorophenyl)-N-(2-ethylthioethyl)-7,8-dihydro-8-methyl-7-oxo-6-pteridinecarboxamide. |
| 4-amino-7-hydroxy-2-(p-methoxyphenyl)-6-pteridinecarboxamide and diethylsulfate. | 4-amino-8-ethyl-7,8-dihydro-2-(p-methoxyphenyl)-7,8-dihydro-7-oxo-6-pteridinecarboxamide. |
| 4-amino-N-ethyl-7-hydroxy-2-(m-trifluoromethylphenyl)-6-pteridinecarboxamide and dimethylsulfate. | 4-amino-N-ethyl-7,8-dihydro-8-methyl-7-oxo-2-(m-trifluoromethylphenyl)-6-pteridinecarboxamide. |
| 4-amino-2-(p-bromophenyl)-N-butyl-7-hydroxy-6-pteridinecarboxamide and diethylsulfate. | 4-amino-2-(p-bromphenyl)-N-butyl-8-ethyl-7,8-dihydro-7-oxo-6-pteridinecarboxamide. |
| 4-amino-N-(2-ethoxyethyl)-7-hydroxy-2-phenyl-6-pteridinecarboxamide and dipropylsulfate. | 4-amino-N-(2-ethoxyethyl)-7,8-dihydro-7-oxo-2-phenyl-8-propyl-6-pteridinecarboxamide. |
| 4-amino-N-(2-ethoxyethyl)-7-hydroxy-2-(p-propylphenyl)-6-pteridinecarboxamide and diethylsulfate. | 4-amino-N-(2-ethoxyethyl)-8-ethyl-7,8-dihydro-7-oxo-2-(p-propylphenyl)-6-pteridinecarboxamide. |
| 4-amino-7-hydroxy-N-methyl-2-phenyl-6-pteridinecarboxamide and diamylsulfate. | 4-amino-8-amyl-7,8-dihydro-N-methyl-7-oxo-2-phenyl-6-pteridinecarboxamide. |

Example IV

The procedure of Example II is repeated reacting the oxopteridinecarboxamides of Example III with phosphorus pentasulfide to produce the following oxopteridinethiocarboxamides:

4-amino-2-(p-chlorophenyl)-N-(2-ethylthioethyl)-7,8-dihydro-8-methyl-7-oxo-6-pteridinethiocarboxamide.

4-amino-8-ethyl-7,8-dihydro-2-(p-methoxyphenyl)-7-oxo-6-pteridinethiocarboxamide.

4-amino-N-ethyl-2-(m-trifluoromethylphenyl)-7,8-dihydro-8-methyl-7-oxo-6-pteridinethiocarboxamide.

4-amino-2-(p-bromophenyl)-N-butyl-8-ethyl-7,8-dihydro-7-oxo-6-pteridinethiocarboxamide.

4-amino-N-(2-ethoxyethyl)-8-ethyl-7,8-dihydro-7-oxo-2-(p-propylphenyl)-6-pteridinethiocarboxamide.

4-amino-N-(2-ethoxyethyl)-7,8-dihydro-7-oxo-2-phenyl-8-propyl-6-pteridinethiocarboxamide.

4-amino-8-amyl-7,8-dihydro-N-methyl-7-oxo-2-phenyl-6-pteridinethiocarboxamide.

Example V

To a solution of 50 ml. of 3 N sodium hydroxide solution in 900 ml. of water is added 6.8 g. of 4-amino-7-hydroxy - N - (2-methoxyethyl)-2-phenyl-6-pteridinecarboxamide, and the mixture is stirred. When solution is complete, 4 ml. of diethylsulfate is added dropwise at room temperature. The mixture is stirred for two hours, a further 2 ml. of diethyl sulfate is added, and stirring is continued for another 90 minutes. The resulting precipitate is removed by filtration, washed with water and recrystallized from ethanol. In this manner, is obtained 4 - amino - 8 - ethyl-7,8-dihydro-N-(2-methoxyphenyl)-7-oxo-2-phenyl-6-pteridinecarboxamide, M.P. 257° C.

*Analysis.*—Calc'd for $C_{18}H_{20}N_6O_3$: C, 58.69; H, 5.47; N, 22.81. Found: C, 58.74; H, 5.50; N, 22.67.

Example VI

To a solution of 15 ml. of 2 N sodium hydroxide in 40 ml. of water is added 3.9 g. of 4-amino-N-(2-butoxyethyl)-7-hydroxy-2-phenyl-6-pteridinecarboxamide, and a solution is obtained by gentle warming. This solution is then cooled to 50° C. with stirring, and 2 ml. of dimethylsulfate is added dropwise. A precipitate slowly comes out of solution, is removed by filtration and recrystallized from ethanol to yield 4-amino-N-(2-butoxyethyl)-7,8-dihydro-8-methyl-7-oxo-2-phenyl-6-pteridinecarboxamide.

A mixture of 5.0 g. of the above prepared 4-amino-N-(2 - butoxyethyl)-7,8-dihydro-8-methyl-7-oxo-2-phenyl-6-pteridinecarboxamide and 7.3 g. of phosphorus pentasulfide in 75 ml. of anhydrous pyridine is stirred and refluxed for two hours. The resulting mixture is then poured into 1 liter of boiling water and after cooling, the precipitate is recovered by filtration. Recrystallization from 2-ethoxyethanol affords 4-amino-N-(2-butoxyethyl)-7,8-dihydro-8-methyl-7-oxo-2-phenyl-6-pteridinethiocarboxamide.

Example VII

Ten grams of 4 - amino-7-hydroxy-N-(4-methylthiobutyl)-2-phenyl-6-pteridinecarboxamide is dissolved in a solution containing 50 ml. 3 N sodium hydroxide in 500 ml. of water. The solution is stirred, 9.0 g. of dimethylsulfate is added dropwise and stirring is continued for 60 minutes at 5° C. A thick precipitate develops which is filtered and then washed with water. Recrystallization from ethanol yields 4-amino-7,8-dihydro-8-methyl-N-(4-methylthiobutyl)-7-oxo-2-phenyl-6-pteridinecarboxamide.

A mixture of 1.0 g. of the above prepared, 4-amino-7,8-dihydro - 8 - methyl-N-(4-methylthiobutyl)-7-oxo-2-phenyl-6-pteridinecarboxamide and 1.5 g. of phosphorus pentasulfide in 20 ml. of dry pyridine is stirred and refluxed for 30 minutes. The resulting mixture is poured into 200 ml. of hot water and after cooling, the precipitate is filtered. Recrystallization from 2-methoxyethanol followed by a further recrystallization from methanol affords 4-amino-7, 8 - dihydro - 8-methyl-N-4-methylthiobutyl)-7-oxo-2-phenyl-6-pteridinethiocarboxamide.

Example VIII

Ten and one tenth grams of 4-amino-7-hydroxy-N-methyl-2-phenyl-6-pteridinecarboxamide is dissolved in a solution of 50 ml. 3 N sodium hydroxide in 400 ml. of water. The solution is stirred, cooled and 8.6 g. of dimethylsulfate is added dropwise, with stirring, for 30 minutes at 10° C. During this time a precipitate develops which is removed by filtration, and washed with water. Recrystallization from ethanol yields 4-amino-7,8-dihydro - N - methyl-8-methyl-7-oxo-2-phenyl-6-pteridinecarboxamide, M.P. 306° C.

*Analysis.*—Calc'd for $C_{15}H_{14}N_6O_2$: C, 58.05; H, 4.55; N, 27.09. Found: C, 58.02; H, 4.15; N, 26.96.

Utilizing the procedure of Example II, the above compound is converted to 4-amino-7,8-dihydro-N-methyl-8-methyl-7-oxo-2-phenyl-6-pteridinethiocarboxamide.

Example IX

To a solution of 50 ml. of 3 N sodium hydroxide solution in 900 ml. of water is added 6.5 g. of 4-amino-2-(p-fluorophenyl)-7-hydroxy-6-pteridinecarboxamide and the mixture is stirred. When the reactant dissolves, 4 ml. of diethylsulfate is added dropwise at 50° C. The resulting mixture is stirred for 5 hours, then a further 4 ml. of diethylsulfate is added, and stirring is continued for another 180 minutes. The resulting precipitate is filtered and washed with water. Recrystallization from ethanol yields 4 - amino-8-ethyl-2-(p-fluorophenyl)-7,8-dihydro-7-oxo-6-pteridinecarboxamide.

In a similar manner, 4-amino-8-ethyl-7,8-dihydro-2-(o-iodophenyl) - 7 - oxo-6-pteridinecarboxamide; 4-amino-8-ethyl - 7,8 - dihydro - 7-oxo-2-(p-propoxyphenyl)-6-pteridinecarboxamide and 4-amino-8-ethyl-2-(p-hexylphenyl)-7,8-dihydro-7-oxo-6-pteridinecarboxamide are produced.

Example X

A mixture of 21.5 g. of 4-amino-8-ethyl-2-(p-fluorophenyl) - 7,8-dihydro-7-oxo-6-pteridinecarboxamide and 29.3 g. of phosphorus pentasulfide in 300 ml. of dry pyridine is stirred and refluxed for two hours. The resulting mixture is poured into 2 liters of hot water and, after cooling, the precipitate which forms is removed by filtration. Recrystallization from 2-ethoxyethanol followed by a further crystallization from propanol yields 4-amino-8-ethyl-2 - (p-fluorophenyl)-7,8-dihydro-7-oxo-6-pteridinethiocarboxamide.

In a similar manner, 4-amino-8-ethyl-7,8-dihydro-2-(o-iodophenyl)-7-oxo-6-pteridinethiocarboxamide; 4-amino-8 - ethyl - 7,8-dihydro-7-oxo-2-(p-propoxyphenyl)-6-pteridinethiocarboxamide and 4 - amino-8-ethyl-2-(p-hexylphenyl) - 7,8 - dihydro-7-oxo-6-pteridinethiocarboxamide are produced.

Example XI

Five grams of 4 - amino-7-hydroxy-N-(6-methylthiohexyl)-2-phenyl-6-pteridinecarboxamide is dissolved in a solution of 25 ml. 2 N sodium hydroxide in 200 ml. of water. The solution is stirred, cooled to 10° C., then 4.3 g. of dimethylsulfate is added dropwise with stirring. The resulting precipitate is removed by filtration and washed with water. Recrystallization from ethanol yields 4-amino - 7,8 - dihydro-8-methyl-N-(6-methylthiohexyl)-7-oxo-2-phenyl-6-pteridinecarboxamide.

Similarly, the following compounds are prepared:

4 - amino - 7,8 - dihydro-8-methyl-7-oxo-2-(p-tolyl)-6-pteridinecarboxamide; 4 - amino-2-(m-ethylphenyl)7,8-dihydro - 8 - methyl-7-oxo-6-pteridinecarboxamide and 4-amino - 2 - (p-butoxyphenyl)-7,8-dihydro-8-methyl-7-oxo-6-pteridinecarboxamide.

Example XII

A mixture of 2.15 g. of 4-amino-7,8-dihydro-8-methyl-N - (6 - methylthiohexyl)-7-oxo-2-phenyl-6-pteridinecarboxamide and 2.9 g. of phosphorus pentasulfide in 50 ml. of dry pyridine is stirred and refluxed for 90 minutes. Thereafter, the reaction mixture is poured into 200 ml. of boiling water. After cooling, the resulting precipitate is filtered and recrystallized from ethanol. In this manner, is obtained 4 - amino-7,8-dihydro-8-methyl-N-(6-methylthiohexyl)-7-oxo-2-phenyl - 6 - pteridinethiocarboxamide.

Similarly, the following pteridinethiocarboxamides are prepared: 4 - amino - 7,8 - dihydro-8-methyl-7-oxo-2-(p-tolyl) - 6-pteridinethiocarboxamide; 4-amino-2-(m-ethylphenyl) - 7,8-dihydro-8-methyl-7-oxo-6-pteridinethiocarboxamide and 4-amino-2-(p-butoxyphenyl)-7,8-dihydro-8-methyl-7-oxo-6-pteridinethiocarboxamide.

Example XIII

Ten grams of 4 - amino-7-hydroxy-N-(4-methylthiobutyl)-2-phenyl-6-pteridinecarboxamide is dissolved in a solution containing 50 ml. of 3 N sodium hydroxide in 500 ml. of water. The solution is stirred, 10.0 g. of dipropylsulfate is added dropwise, and stirring is continued for 60 minutes at 15° C. A thick precipitate develops which is filtered and then washed with water. Recrystallization from ethanol yields 4-amino-7,8-dihydro-N-(4-methylthiobutyl) - 7 - oxo-2-phenyl-8-propyl-6-pteridinecarboxamide.

A mixture of 1.0 g. of the above prepared, 4-amino-7,8-dihydro - N-(4-methylthiobutyl)-7-oxo-2-phenyl-8-propyl-6-pteridinecarboxamide and 1.5 g. of phosphorus pentasulfide in 20 ml. of dry pyridine is stirred and refluxed for 30 minutes. The resulting mixture is poured into 200 ml. of hot water and after cooling, the precipitate is filtered. Recrystallization from 2-methoxyethanol followed by a further crystallization from methanol affords 4-amino-7,8-dihydro - N-(4-methylthiobutyl)-7-oxo-2-phenyl-8-propyl-6-pteridinethiocarboxamide.

Example XIV

Twenty grams of 4-amino-7-hydroxy-N-(2-ethyloxyethyl)-2-phenyl-6-pteridinecarboxamide is dissolved in a solution containing 100 ml. of 3 N sodium hydroxide in 1000 ml. of water. The solution is stirred, 20.0 g. of dibutylsulfate is added dropwise and stirring is continued for 50 minutes at 10° C. Thereafter, the precipitate is filtered, washed with water and recrystallized from ethanol to yield 4-amino-8-butyl-N-(2-ethyloxyethyl)-7,8-dihydro-7-oxo-2-phenyl-6-pteridinecarboxamide.

A mixture of 3.0 g. of the above prepared 4-amino-8-butyl - N - (2-ethyloxyethyl)-7,8-dihydro-7-oxo-2-phenyl-6-pteridinecarboxamide and 4.5 g. of phosphorus pentasulfide in 60 ml. of anhydrous pyridine is stirred and refluxed for 50 minutes. The resulting mixture is poured into 600 ml. of boiling water and, after cooling, the precipitate is filtered. Recrystallization from 2-ethoxyethanol, followed by a further crystallization from ethanol, affords 4-amino - 8 - butyl-N-(2-ethoxyethyl)-7,8-dihydro-7-oxo-2-phenyl-6-pteridinethiocarboxamide.

Example XV

Five grams of 4-amino-N-butyl-2-(p-chlorophenyl)-7-hydroxy-6-pteridinecarboxamide is dissolved in a solution containing 40 ml. of 2 N sodium hydroxide in 250 ml. of water. The solution is stirred, 6.0 g. of dibutylsulfate is added dropwise, and stirring is continued for 90 minutes at 250° C. A thick precipitate develops which is filtered, washed with water, and recrystallized from ethanol. In this manner, is obtained 4-amino-N-butyl-8-butyl-2-(p-chlorophenyl) - 7,8 - dihydro - 7-oxo - 6-pteridinecarboxamide.

A stirred mixture of 0.5 g. of the above prepared 4-amino - N - butyl-8-butyl-2-(p-chlorophenyl)-7,8-dihydro-7-oxo-6-pteridinecarboxamide and 0.8 g. of phosphorus pentasulfide in 15 ml. of anhydrous pyridine is refluxed for one hour. The resulting mixture is admixed into 100 ml. of hot water. After cooling, the precipitate is filtered and recrystallized from 2-ethoxyethanol and then further recrystallized from propanol. In this manner, is obtained 4 - amino - N - butyl-8-butyl-2-(p-chlorophenyl)-7,8-dihydro-7-oxo-6-pteridinethiocarboxamide.

*Example XVI*

Ten grams of 4-amino-7-hydroxy-2-(p-tolyl)-6-pteridinecarboxamide is dissolved in a solution containing 50 ml. of 3 N sodium hydroxide in 500 ml. of water. The solution is stirred, 9.0 g. of dipropylsulfate is added dropwise, and stirring is continued for 60 minutes at 5° C. A thick precipitate develops which is filtered and then washed with water. Recrystallization from ethanol yields 4-amino - 7,8 - dihydro-7-oxo-8-propyl-2-(p-tolyl)-6-pteridinecarboxamide.

A mixture of 1.0 g. of the above prepared, 4-amino-7,8-dihydro - 7 - oxo - 8-propyl-2-(p-tolyl)-6-pteridinecarboxamide and 1.5 g. of phosphorus pentasulfide in 20 ml. of dry pyridine is stirred and refluxed for 30 minutes. The resulting mixture is poured into 200 ml. of hot water and, after cooling, the precipitate is filtered. Recrystallization from 2-methoxyethanol, followed by a further crystallization from methanol, affords 4-amino-7,8-dihydro-7-oxo-8-propyl-2-(p-tolyl)-6-pteridinethiocarboxamide.

What is claimed is:
1. A compound selected from the group consisting of those having the formula:

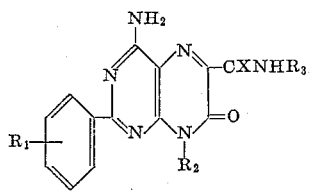

wherein $R_1$ is selected from the group consisting of hydrogen, trifluoromethyl, halogen, lower alkyl and lower alkoxy; $R_2$ is lower alkyl; $R_3$ is selected from the group consisting of hydrogen, lower alkyl, lower alkoxy(lower)alkyl, lower alkylthio(lower)alkyl; and X is selected from the group consisting of oxygen and sulfur.

2. 4 - amino - 7,8 - dihydro-8-methyl-N-(2-methoxyethyl)-7-oxo-2-phenyl-6-pteridinecarboxamide.

3. 4 - amnio - 7,8 - dihydro-8-methyl-N-(2-methoxyethyl)-7-oxo-2-phenyl-6-pteridinethiocarboxamide.

4. 4 - amino - 8-ethyl-7,8-dihydro-N-(2-methoxyethyl)-7-oxo-6-pteridinecarboxamide.

5. 4 - amino - 7,8 - dihydro-N-methyl-8-methyl-7-oxo-2-phenyl-6-pteridinecarboxamide.

6. 4 - amino - 8-ethyl-7,8-dihydro-N-(2-methoxyethyl)-7-oxo-2-phenyl-6-pteridinethiocarboxamide.

7. A compound selected from the group consisting of those having the formula:

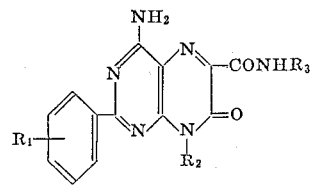

wherein $R_1$ is selected from the group consisting of hydrogen, trifluoromethyl, halogen, lower alkyl and lower alkoxy; $R_2$ is lower alkyl; and $R_3$ is selected from the group consisting of hydrogen, lower alkyl, lower alkoxy(lower)alkyl, lower alkylthio(lower)alkyl.

8. 4 - amino - 2 - (p-chlorophenyl)-N-(2-ethylthioethyl-7,8-dihydro-8-methyl-7-oxo-6-pteridinecarboxamide.

9. 4 - amino-8-ethyl-7,8-dihydro-2-(p-methoxyphenyl)-7-oxo-6-pteridinecarboxamide.

10. 4 - amino - N-ethyl-7,8-dihydro-8-methyl-7-oxo-2-(m-trifluoromethylphenyl)-6-pteridinecarboxamide.

11. A compound selected from the group consisting of those having the formula:

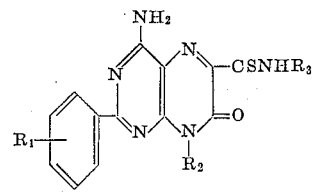

wherein $R_1$ is selected from the group consisting of hydrogen, trifluoromethyl, halogen, lower alkyl and lower alkoxy; $R_2$ is lower alkyl; and $R_3$ is selected from the group consisting of hydrogen, lower alkyl, lower alkoxy(lower)alkyl, lower alkylthio(lower)alkyl.

12. 4 - amino - 2-(p-chlorophenyl-N-(2-ethylthioethyl)-7,8-dihydro-8-methyl-7-oxo-6-pteridinecarboxamide.

13. 4 - amino - 8 - ethyl-7,8-dihydro-2-(p-methoxyphenyl)-7-oxo-6-pteridinethiocarboxamide.

14. 4 - amino - N - ethyl-7,8-dihydro-8-methyl-7-oxo-2-(m-trifluoromethylphenyl)-6-pteridinethiocarboxamide.

References Cited by the Examiner
UNITED STATES PATENTS
3,122,543   2/1964   Osdene _____ 260—251.5

NICHOLAS S. RIZZO, *Primary Examiner.*